Sept. 21, 1937.  E. M. LA BOITEAUX  2,093,731
MECHANICAL ANALYZING AND CONTROL MECHANISM FOR TABULATING MACHINES
Filed Aug. 7, 1935    2 Sheets-Sheet 1
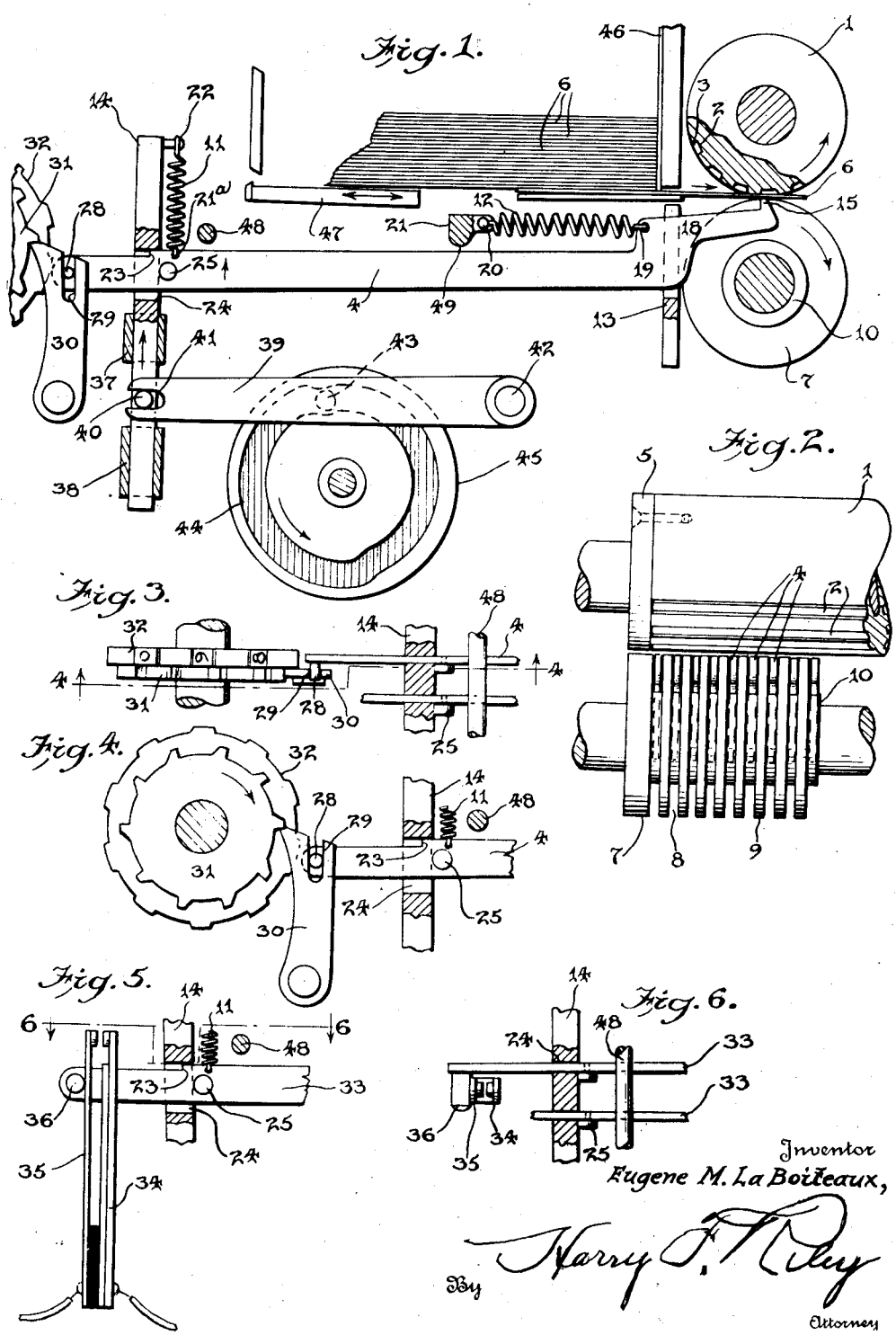

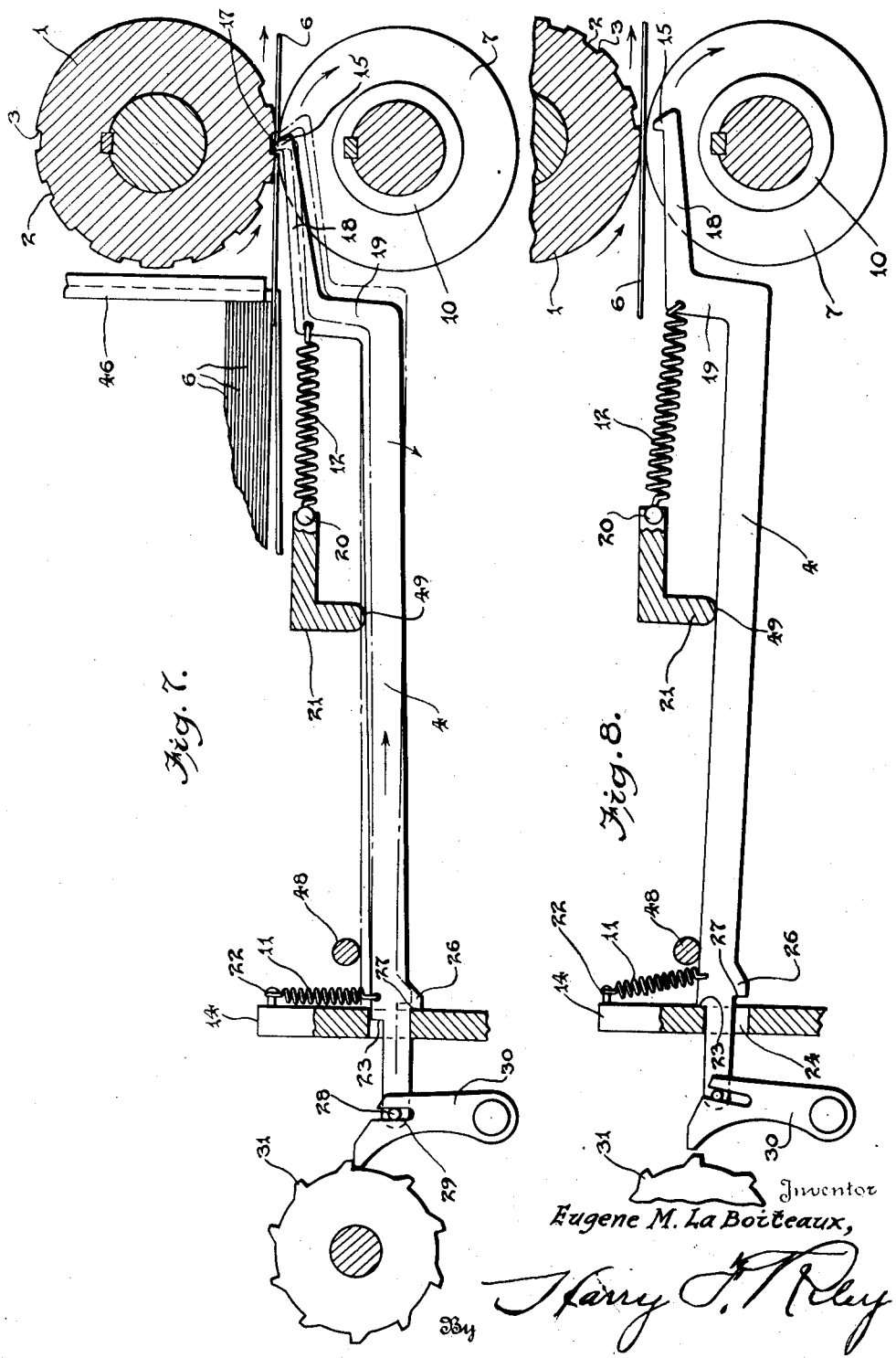

Patented Sept. 21, 1937

2,093,731

UNITED STATES PATENT OFFICE 2,093,731

MECHANICAL ANALYZING AND CONTROL MECHANISM FOR TABULATING MACHINES

Eugene M. La Boiteaux, Washington, D. C.

Application August 7, 1935, Serial No. 35,217

19 Claims. (Cl. 235—61.11)

The invention relates to a mechanical analyzing and control mechanism for perforated record-controlled tabulating machines of the type shown and described in Patent No. 1,516,772, granted to me November 25, 1924.

In devising a practical mechanical means, as distinguished from the electrical and contact-brush method, for analyzing one or more of a series of successively presented predetermined positions of possible perforations in a record card when said record is continuously moving past the analyzing member, said movement of record card being synchronous with the movement of a number wheel or other mechanism constituting an accumulating or recording device, the difficulty, heretofore, has been to derive from the primary analyzing point or source sufficient power or effect, directly, to positively actuate or control these devices. The mechanism of the present invention permits a flimsy record card, without injury thereto, to function effectively as the initial means of control.

A further object of the invention is to provide simple, compactly arranged and highly effective mechanical analyzing and control mechanism provided with a floating analyzing member having a mild but effective analyzing contact with the record card and movable lineally in the direction of movement of the card by direct pulling action of a rotary power transmitting analyzing element for operating the control mechanism.

A further object of the invention is to provide a mechanical analyzing and control mechanism provided with a floating lineally movable analyzing member adapted to be actuated by the analyzing roll during the forward feeding of a record card and directly coupled to or connected with the controlling means of the accumulating or recording mechanism, whereby the analyzing roll is directly connected with the controlling means of the accumulating mechanism for operating such controlling means by a direct pulling action of the analyzing roll 1 which constitutes a rotatable power transmitting and analyzing element. Objectives worthy of attainment have been achieved in this invention by the comparatively simple means adopted to obtain the close and intimate coupling between the primary analyzing member and the translating mechanism.

A further object of the invention has been attained by a decrease in duties imposed upon the record card, such as "holding" means by relieving the record card of duty after its first initial control of the analyzing bar 4. Other advantages accruing through the use of the present invention as a means for closing and maintaining for varying periods of time as directly determined by the record card, electrical contacts adapted to carry higher current values than is usual in this class of apparatus, will be apparent to those familiar with the art.

With these and other objects in view, the invention consists in the novel construction, combination and arrangement of parts hereinafter fully described, illustrated in the accompanying drawings and pointed out in the claims hereto appended, it being understood that various changes within the scope of the claims may be made without departing from the spirit or sacrificing any of the advantages of the invention.

In the drawings:

Figure 1 is a side elevational view partly in section of a mechanical analyzing and control mechanism constructed in accordance with this invention.

Figure 2 is a detail elevation illustrating a portion of the upper analyzing power transmitting feed roll and the lower idler feed roll.

Figure 3 is a detail plan view partly in section showing the rear portion of two of the analyzing bars or members and showing the connection of one of the same with the control pawl of the accumulating mechanism.

Figure 4 is a detail sectional view taken on the line 4—4 of Figure 3.

Figure 5 is a detail elevation partly in section illustrating the manner of operating the electrical control mechanism.

Figure 6 is a detail horizontal sectional view taken substantially on the line 6—6 of Figure 5.

Figure 7 is an enlarged longitudinal sectional view of a portion of a mechanical analyzing and control mechanism showing the floating analyzing bar or member engaged with one of the radial shoulders of the analyzing power transmitting feed roll.

Figure 8 is a similar view illustrating the arrangement of the floating analyzing bar or member after same has been moved lineally and latched in its forward position.

Referring to the accompanying drawings, in which is illustrated the preferred embodiment of the invention, 1 designates an analyzing feed roll constituting a rotatable power transmitting analyzing element and provided in its periphery with a series of longitudinal grooves or slots 2 forming sinks or recesses and providing radial shoulders 3 for engaging and actuating by a direct pulling action lineally movable analyzing bars or members 4, each constituting an analyzing device.

The analyzing feed roll 1 rotates in the direction of the arrows in Figures 1, 7, and 8 of the drawings, and the grooves or slots 2 which are disposed longitudinally of the roll 1 are spaced in accordance with the longitudinal pitch and angular position required. The rotatable analyzing element or feed roll 1 is provided at each end with a cylindrical head 5 suitably secured to the ends of the grooved body portion of the analyzing feed roll 1 and providing continuous tractive effect for feeding record cards 6. The sinks 2 and the radial shoulders 3 which move the analyzing bars or members longitudinally by a direct pulling action in a forward direction, that is, the direction in which the record card 6 is moving, may be formed in any other desired manner.

A lower idler feed roll 7 cooperates with the upper analyzing feed roll 1 and is provided with a plurality of channels 8, which may be formed in the feed roll 7 or the latter may be built up of plain disks 9 alternating with smaller diameter collars 10 providing clearance spaces for the front end portions of the analyzing bars 4. The disks 9 or partitions separating the intervening clearance spaces 8 afford a desirable supporting and limiting means as well as providing tractive effect upon the record card. The lower idler feed roll 7 is designed to be yieldably supported and is preferably mounted in spring-tension pivoted hangers (not shown), but any other suitable means may be employed for yieldably mounting the lower feed roll and for maintaining the desired pressure against the lower face of a record card. It will be understood, of course, that the upper and lower rolls 1 and 7 and all other rotating and reciprocating members are geared together in timed relation with the record card in its travel to and between the upper and lower rolls 1 and 7. As the gearing for such purpose is well understood in the art and as any suitable gearing may be employed for this purpose, detailed illustration and description thereof are deemed unnecessary.

A plurality of coupling analyzing bars 4 to the required number are suspended by springs 11 and 12 and are guided at their forward ends by a comb 13 common to all of the analyzing bars or members, and the latter are guided at their rear ends by a cam slide detent 14 which is also common to all of the analyzing bars. The forward end of each of the analyzing bars terminates in a dog-tooth 15 capable of freely entering any groove or sink 2 in the series in the analyzing feed roll when a perforation 17 in the record card 6 coincides with said groove or sink, the analyzing bar being actuated in such movement by the spring 12. The front portion 18 is preferably upwardly offset from the body portion of the analyzing bar and is connected to the forward end 19 of the coil spring 12 which may be disposed at a slight inclination as clearly shown in Figure 8 of the drawings when the analyzing bar 4 is in analyzing contact with the record card as illustrated in Figure 1 of the drawings. The inclination of the spring 12 is not essential to the operation of the analyzing bar or member 4 as the point of attachment of the spring 12 is at the offset of the analyzing bar or member located above the stop 25 or 26 at the rear end of the analyzing bar or member. The spring 12 is arranged above the stop 25 or 26 and the analyzing bar or member has no period of vibration due to the spring 12 and is dead and can be operated at any speed.

The rear end 20 of the spring 12 is attached to a fixed horizontally-disposed transversely-arranged fulcrum bar 21 located above the analyzing bars and common to all of the same and adapted to be engaged by the analyzing bar 4 for causing a rocking movement of the analyzing bar to withdraw the dog-tooth from the sink 2 of the indexing feed roll and from the hole in the record card as the analyzing bar is latched, as hereinafter fully described, at the limit of its forward movement. The rear spring 11, which is preferably a coil spring, is arranged vertically and the lower end of the spring 11 is connected at 21ª to the rear portion of the analyzing bar 4 and the upper end 22 of the spring 11 may be conveniently attached to the cam-actuated slide detent 14.

The analyzing bar 4 is provided at its rear portion with a latch shoulder 23 located at the upper edge of the analyzing bar and adapted to be lifted into latching engagement with the cam-actuated slide detent for holding the analyzing bar in its forward position after it has been lineally actuated by the analyzing feed roll 1. The slide 14 is provided with slots 24 in which are arranged the rear portions of the analyzing bars 4 which are also provided with an individual bar stop which may be in the form of a headed stud 25 as illustrated in Figures 1, 3, 4, and 6 of the drawings, or it may consist of a lug 26 formed integral with the analyzing bar 4 and providing a shoulder 27 for engaging the cam-actuated detent slide 14. The lug which is shown at the bottom of the analyzing bar in Figures 7 and 8 of the drawings may be located in any other desired position. The individual bar stop limits the backward movement and defines the backward position of the analyzing bars.

Each of the analyzing bars is extended rearwardly beyond the cam-actuated slide 14 and is provided with a laterally extending pin 28 which operates in a slot 29 of a pawl or dog 30 arranged to engage a ratchet wheel 31 of a number disk or wheel 32 of suitable accumulating or recording mechanism. The pawl or dog 30 operates to arrest the movement of the number wheel of the accumulating mechanism when it is in engagement with the ratchet wheel 31, as illustrated in Figures 1 and 7 of the drawings, and when it is withdrawn from engagement with the ratchet wheel 31, as illustrated in Figure 8 of the drawings, it permits the operation of the accumulating or recording mechanism such as is disclosed in my aforesaid patent. Instead of employing the pin and slot connection between the rear end of the analyzing bar and the pawl or dog 30, any other suitable means may be provided for such purpose.

In Figures 5 and 6 of the drawings the analyzing bar 33, which is of the same construction as the analyzing bar 4, is shown arranged for operating an electrical means for controlling accumulating or recording mechanism. The electrical controlling means consists of electrical contacts 34 and 35 which are automatically separable preferably through the resiliency of the material of which the contact 35 is constructed and adapted to be moved into electrical engagement by the analyzing bar 33. The rear end of the analyzing bar 33 is provided with a laterally extending pin 36 located in rear of the movable contact 35 and adapted to carry the same into electrical engagement with the contact 34 for holding a circuit closed when the analyzing bar is moved lineally to its forward latching position.

The detent slide 14, which is mounted in suitable guides 37 and 38, is connected at one end of a cam-actuated lever 39 by a pin 40 which is arranged in a slot 41 in one end of the lever 39. The other end of the lever is pivoted at 42 and the lever 39 is provided at a point intermediate its ends with a roller 43 or other suitable means for engaging a cam groove 44 of a cam wheel 45 which rotates in the direction of the arrow in Figure 1 of the drawings.

The record cards are advanced successively from a hopper 46 to the feeding grip between the upper and lower rolls 1 and 7 by the usual reciprocating ratchet feeding device 47, possible perforations in the record card in its progress coinciding with corresponding radial grooves or sinks 2 in the analyzing feed roll 1. Assuming that the leading edge of a record card in its progress between the upper analyzing feed roll 1 and the lower idler roll 7 has reached a position slightly beyond the dog-tooth 15 of the analyzing bar 4, the cam detent slide 14 moving downwardly by actuation through the cam 45 permits the tooth 15 to assume a feeling or analyzing contact with the record, supplemented by the mild though highly effective agency of the spring 12 due to its placement. Assuming further that the first possible index position in this column on the record card has been perforated and has reached its corresponding groove or sink in the analyzing feed roll 1, the said dog-tooth will be projected into engagement with the analyzing feed roll 1. In this projection movement the analyzing bar rocks on the stop 25 or 26 and thereby secures a maximum working freedom of said analyzing bar 4.

The continued rotation of the analyzing feed roll 1 through its positive engagement with the tooth of the analyzing bar pulls the analyzing bar forward until the latch shoulder 23 passes the face of the cam slide detent, when the rear end of the bar is pulled upwardly by the spring 11 and latched in the forward position. In the beginning of the latching or upward movement of the analyzing bar 4, its upper edge comes into contact with the fixed fulcrum 21, thus deflecting downwardly the forward end of the bar and thereby its instant disengagement from the analyzing feed roll and withdrawal from the perforation of the record card.

In the operation just explained, the forward movement of the analyzing bar has, through its slot and pin connection with the pawl 30, moved the pawl out of engagement with the ratchet wheel 31 and ceased to arrest the movement of the number wheel 32 of the accumulating or recording mechanism under control. The record card 6 having now advanced to the completion of all possible or needful operative or index positions, the cam slide detent 14 is thrown upwardly by the cam 45 which, through a stop 48 common to all of the analyzing bars 4, acts to disengage from their respective latch shoulders 23 all the bars which have been operated and the springs 12 now functioning in a retractile capacity move the analyzing bars 4 rearwardly and carry the pawls 30 into engagement with their respective ratchet wheels 31. After the analyzing bar drops into one of the recesses of the rotatable analyzing roll and is engaged with one of the radial shoulders thereof, it is dead and has no period of vibration of its own. The atonic characteristic of the analyzing end of the analyzing bar 4 due to its method of suspension, namely, its freedom from vibratory effects which interfere with the performance of a specific function enables its longitudinal movement to be definitely determined and to be critically constant at all speeds and at the same time permits the full power characteristic of the analyzing power transmitting roll 1 to be utilized in a most efficient and effective manner without the necessity of amplifying the movement transmitted to the analyzing bar 4 by the analyzing roll 1, as is necessary when the analyzing device takes the form of a bell crank lever pivoted at a fixed point and is employed for positively actuating another element or member. This feature of the analyzing device is highly important especially when close adjustments are demanded. Also as it is unnecessary to amplify the movement of the analyzing bar 4, the wear on the tooth 15 of the analyzing bar and the radial shoulders 3 of the analyzing roll is reduced to a minimum.

As an example, in the case of the progress of the record card just described controlling a frictionally driven number wheel 32 in correct ratio with the analyzing feed roll 1, will, upon release by the pawl 30, have rotated nine-tenths of a rotation, or, in other words, will have accumulated nine when again arrested by the pawl 30 at the end of the operative cycle. As previously explained, the frictionally driven number wheel 32 is of the same construction as the number wheels of the said patent.

The fixed stop 48 preferably consists of a rod disposed horizontally and extending transversely with relation to the longitudinally movable analyzing bars 4. The fixed fulcrum 21 which has a rounded lower face 49 does not interfere with the freedom of the initial vertical and longitudinal movement of the analyzing bar 4 and it is only at the beginning of the latching movement that the fixed fulcrum bar comes into play and effects the withdrawal of the dog-tooth 15 from the analyzing feed roll and the record card. When the analyzing bar is rocked to withdraw the tooth 15 from the analyzing roll and the record card, it is thereafter maintained out of engagement with the record card as clearly illustrated in Figure 8 of the drawings. It will thus be seen that the record card is relieved of duty after its initial control of the analyzing bar or member 4.

It should be noted that the responsive and speedy action of the forward end of the analyzing bar 4, due largely to the placement of the spring 12 as shown, results in such a definite movement or depth of penetration into the grooves or sinks in the analyzing feed roll 1, even at comparatively high speeds, as to allow a pronounced rounding or radius at the corner of the dog-tooth 15, thereby preventing any marring of the record card through the preliminary or subsequent contact of the tooth therewith. The grooves or sinks 2 in the analyzing feed roll 1 are of less width than the diameter of the perforations or holes in the record card to prevent any untoward effect upon the leading edge of a hole or perforation in a record card, the edges of the hole or perforation being thereby well protected. Also, while the analyzing bars are shown in rear of the analyzing roll, they may, of course, be mounted in any other desired position. While nine grooves or sinks 2 are shown in the analyzing feed roll for integrating or accumulating purposes, a greater or less number of grooves or sinks 2 may be employed for unit work, where each groove or sink would have unit value.

What is claimed is:

1. In mechanism of the class described, a floating analyzing bar provided with a tooth adapted to project through a hole in a record card while the card is travelling past the analyzing position, an analyzing roll provided with shoulders for engaging the tooth for moving the bar longitudinally in a forward direction, front and rear springs constituting the sole support of the analyzing bar and adapted to hold the tooth in analyzing contact with a record card, one of said springs being arranged to act in a retractile capacity for moving the bar rearwardly, latching means for holding the analyzing bar in its forward position and for maintaining the tooth out of contact with the record card to relieve the latter of further duty, and means for releasing the analyzing bar at the end of an operative cycle.

2. In mechanism of the class described, an analyzing roll provided with shoulders, a floating analyzing bar provided at the front end with a tooth and having a latch shoulder at its rear end, front and rear springs supporting said bar and adapted to hold the tooth in analyzing contact with a record card, said front spring being arranged to swing the bar upwardly to project the tooth through a hole in the record card and cause the tooth to be engaged by a shoulder of the analyzing roll whereby the bar will be moved longitudinally in a forward direction by the analyzing roll, and means for engaging the latch shoulder when the bar has moved forwardly to retain the bar in its forward position.

3. In mechanism of the class described, an analyzing roll provided with shoulders, a floating analyzing bar provided at the front end with a tooth and having a latch shoulder at its rear end, front and rear springs supporting said bar and adapted to hold the tooth in analyzing contact with a record card, said front spring being arranged to swing the bar upwardly to project the tooth through a hole in the record card and cause the tooth to be engaged by a shoulder of the analyzing roll whereby the bar will be moved longitudinally in a forward direction by the analyzing roll, a detent for engaging the latch shoulder when the bar has moved forwardly whereby the bar is latched and held in its forward position, the rear spring operating to move the bar upwardly in the latching of the bar, and means for rocking the bar during such upward movement to withdraw the tooth from the analyzing roll and cause the tooth to be held out of contact with the record card.

4. In mechanism of the class described, an analyzing roll provided with shoulders, a longitudinally movable analyzing bar provided with a tooth, a spring for urging the bar upwardly to project the tooth through a hole in a record card and cause the tooth to be engaged by a shoulder of the analyzing roll for moving the bar longitudinally in a forward direction, a fixed fulcrum arranged to be engaged by the bar after the latter reaches the limit of its forward movement and means for rocking the bar on the fixed fulcrum to withdraw the tooth from the analyzing roll.

5. In mechanism of the class described, an analyzing roll provided with shoulders, a longitudinally movable analyzing bar provided at its front end with a tooth adapted to be projected through a hole in a record card and be engaged by a shoulder of the analyzing roll for moving the bar longitudinally in a forward direction, said bar having a latch shoulder at its rear end, a cam-actuated detent slide forming a guide for the rear end of the bar and engageable by the latch shoulder after the bar is moved forwardly to hold the bar in its forward position, and spring means for moving the bar rearwardly when the detent is moved out of engagement with the latch shoulder.

6. In mechanism of the class described, an analyzing roll provided with shoulders, a longitudinally movable analyzing bar provided at its front end with a tooth adapted to be projected through a hole in a record card and be engaged by a shoulder of the analyzing roll for moving the bar longitudinally in a forward direction, said bar having a latch shoulder at its rear end, a detent slide forming a guide for the rear end of the bar and engageable by the latch shoulder after the bar is moved forwardly to hold the bar in its forward position, spring means for moving the bar rearwardly when the detent is moved out of engagement with the latch shoulder, and means carried by the bar for engaging the detent slide to limit the rearward movement of the bar, the latter means forming a fulcrum for the bar for causing the bar to be swung upwardly by the spring means when a hole in a record card coincides with the tooth of the analyzing bar.

7. In mechanism of the class described, an analyzing roll provided with shoulders, a longitudinally movable analyzing bar provided at its front end with a tooth adapted to be projected through a hole in a record card and be engaged by a shoulder of the analyzing roll for moving the bar longitudinally in a forward direction, said bar having a latch shoulder at its rear end, a cam actuated detent slide forming a guide for the rear end of the bar and engageable by the latch shoulder after the bar is moved forwardly to hold the bar in its forward position, spring means for moving the bar rearwardly when the detent is moved out of engagement with the latch shoulder, and a fixed stop for limiting the upward movement of the rear end of the analyzing bar for causing an upward movement of the detent slide to unlatch the analyzing bar.

8. In mechanism of the class described, an analyzing roll provided with shoulders, a longitudinally movable analyzing bar provided at one end with a tooth adapted while a record is travelling past the analyzing position to be projected through a hole in the record card and to be engaged by a shoulder of the analyzing roll for moving the bar longitudinally in a forward direction, a pivoted pawl for controlling accumulating mechanism, means carried by the rear end of the bar for directly connecting the bar with said pawl, means for latching the analyzing bar in its forward position, spring means constituting the sole means for supporting the bar and adapted to act in a retractile capacity for moving the bar in the opposite direction to that in which it is moved by the analyzing roll, and means for disengaging the analyzing bar from the roll and for causing the tooth to be held out of engagement with the record card to relieve the record card of further duty after the said forward movement of the analyzing bar.

9. In mechanism of the class described, an analyzing roll provided with shoulders, a longitudinally movable analyzing bar provided at one end with a tooth adapted while a record is travelling past the analyzing position to be projected through a hole in the record card and to be engaged by a shoulder of the analyzing roll for moving the bar longitudinally in a forward direction, means for latching the analyzing bar in its forward position, normally spaced electrical contacts, means carried by the bar for directly engaging and closing the electrical contacts for controlling accumulating mechanism, and means for causing the tooth of the analyzing bar to be held out of contact with the record card at the end of the forward movement of the bar to relieve the record card of further duty.

10. In mechanism of the class described, an analyzing roll provided with a series of radial shoulders, a lineally movable analyzing bar provided at its front end with a tooth adapted while a record is travelling past the analyzing position to project through a hole in the record card and be engaged by a radial shoulder of the analyzing roll whereby the analyzing bar will be moved longitudinally in a forward direction, means for connecting the rear end of the analyzing bar with the controlling means of an accumulating mechanism, means for latching the bar to hold the same in its forward position, means for rocking the analyzing bar to withdraw its tooth from the analyzing roll and hold the tooth out of contact with the record card for relieving the record card of further duty when the analyzing bar is latched, and means for unlatching the analyzing bar and for moving the same rearwardly at the end of an operative cycle.

11. In control mechanism for tabulating machines, in combination, a rotatable power transmitting analyzing means formed to actuate an analyzing device, an analyzing device, said device having a portion to be engaged by the power transmitting means through perforations in a record while the record is travelling past the analyzing point to positively connect the analyzing device to the power transmitting means and cause the analyzing device to travel with the power transmitting means during a portion of the rotative movement thereof, whereby the full force of the power transmitting means is transmitted to the analyzing device, means moved by said analyzing device when said device is actuated by the power transmitting means, and means for disengaging the analyzing device from the rotative power transmitting and analyzing means and for causing said portion of the analyzing device to be held out of contact with the record to relieve the record of further duty after the analyzing device has been actuated by said rotative power transmitting and analyzing means.

12. In control mechanism for tabulating machines, in combination, a rotatable power transmitting analyzing means formed to actuate an analyzing device, an analyzing device, said device having a portion to be engaged by the power transmitting means through perforations in a record while the record is travelling past the analyzing point to positively connect the analyzing device to the power transmitting means and cause the analyzing device to travel with the power transmitting means during a portion of the rotative movement thereof, whereby the full force of the power transmitting means is transmitted to the analyzing device, means for disconnecting the analyzing device from the power transmitting means and for causing the analyzing device to be held out of contact with the record to relieve the record of further duty after the analyzing device has been actuated by said power transmitting means, means for latching the analyzing device for holding the same after it has been moved by said power transmitting means, and means moved by said analyzing device when said device is actuated by said power transmitting means.

13. In control mechanism for tabulating machines, in combination, a rotating power transmitting analyzing element formed with means for actuating an analyzing device, an analyzing device having a portion formed to be positively engaged by and coupled to the actuating means of the power transmitting element through perforations in a record while the record is travelling past the analyzing point to connect the analyzing device to the power transmitting element and cause the power transmitting element to move with it the analyzing device bodily in a forward direction during a portion of the rotative movement of the analyzing element when the analyzing element is rotated, means for disengaging the analyzing device from the rotating analyzing element at the end of such forward movement of the analyzing device and for causing the analyzing device to be held out of contact with the record to relieve the latter of further duty after the analyzing device has been actuated by the rotating analyzing element, and means moved by the analyzing device when said device is actuated.

14. In mechanism of the class described, an analyzing member having a portion formed to extend through a perforation in a record, yieldable means constituting the sole support for the analyzing member and arranged for holding said portion of the analyzing member in analyzing contact with the record and for projecting said portion through a perforation in the record while the record is travelling past the analyzing position, a rotatable analyzing and power transmitting roll provided with means for engaging said portion of the analyzing member when the same is projected through said perforation in the record for moving said member in a general linear direction during a definite portion of the rotative movement of said roll whereby the full power of the roll is transmitted directly to the analyzing member during such rotative movement of the roll, means for connecting the analyzing member with an associated mechanism to be controlled, and means operating at the end of such linear movement of the analyzing member for disengaging said analyzing member from the roll and for causing the analyzing member to be held out of contact with the record to relieve the record of further duty.

15. In mechanism of the class described, a floating analyzing bar reciprocable for controlling an associated mechanism and provided with a tooth formed to be projected through a hole in a record while the record is travelling past the analyzing position, a rotatable analyzing and power transmitting roll having shoulders arranged to engage said tooth and carrying the same with it during a definite portion of its rotative movement whereby the full power of the analyzing and power transmitting roll is transmitted to the analyzing bar to move the same in a general linear direction, yieldable means constituting the sole support of the analyzing bar for holding the tooth of the same in analyzing contact with the record and for projecting the tooth through the perforation of the record, means for connecting the analyzing bar with the mechanism to be controlled, and means for disengaging the tooth of the analyzing bar from said roll at the end of such movement and for causing the same to be held out of contact with the record to relieve the latter of further duty.

16. In mechanism of the class described, a floating analyzing bar reciprocable for controlling an associated mechanism and provided with a tooth adapted to project through a hole in a record while the record is travelling past the analyzing position, a rotatable analyzing and power transmitting roll provided with shoulders engageable with said tooth for carrying the same with it during a portion of its rotative movement whereby the full power of said roll is transmitted to the analyzing bar to move the analyzing bar in the control of the associated mechanism, spring means constituting the sole support of the analyzing bar and adapted to hold the tooth in analyzing contact with the record, and means for disengaging the tooth from the roll at the end of such movement and for causing the tooth to be held out of contact with the record to relieve the latter of further duty.

17. In mechanism of the class described, a floating analyzing bar reciprocable for controlling an associated mechanism and provided with a tooth adapted to project through a hole in a record, while the record is travelling past the analyzing position, a rotative analyzing and power transmitting roll provided with shoulders engageable with said tooth for carrying the same with it during a portion of the rotative movement of the roll whereby the full power of said roll is transmitted to the analyzing bar to move the analyzing bar in a general linear direction, springs constituting the sole support of the analyzing bar and arranged to hold the tooth thereof in analyzing contact with the record, one of the springs being arranged to swing the bar upwardly and project the tooth through a hole in the record and cause the tooth to be engaged by a shoulder of the analyzing and power transmitting roll, means for disengaging the tooth from the roll at the end of such movement and for causing the tooth to be held out of contact with the record to relieve the record of further duty.

18. In mechanism of the class described, a floating analyzing bar reciprocable for controlling an associated mechanism and provided with a tooth adapted to project through a hole in a record while the record is travelling past the analyzing position, an analyzing and power transmitting roll provided with shoulders for engaging said tooth for moving the analyzing bar longitudinally in a forward direction, springs constituting the sole support of the analyzing bar and arranged to hold the tooth in analyzing contact with the record and to project the tooth through a hole in the record, and latching means operable by one of the springs at the end of such movement of the analyzing bar to disengage the tooth from the roll and for latching the analyzing bar in its forward position and for holding the tooth out of engagement with the record to relieve the latter of further duty.

19. In mechanism of the class described, a rotative analyzing and power transmitting roll provided with shoulders, a reciprocable analyzing bar provided at one end with a tooth adapted to be projected through a hole in a record while the record is travelling past the analyzing position, said tooth being engageable with the shoulders of said roll and carried by the latter during a portion of the rotative movement of the roll whereby the full power of said roll is transmitted to the analyzing bar, a pivoted pawl directly connected with the other end of the analyzing bar for controlling an associated mechanism, yieldable means constituting the sole support of the analyzing bar and supporting the tooth in analyzing contact with the record and adapted to project the tooth through a hole in the record, and means for disengaging the tooth from the roll and for causing the same to be maintained out of contact with the record at the end of such movement of the analyzing bar to relieve the record of further duty.

EUGENE M. LA BOITEAUX.